(12) United States Patent
Corley et al.

(10) Patent No.: US 11,292,871 B2
(45) Date of Patent: Apr. 5, 2022

(54) EPOXY RESIN SYSTEMS FOR COMPOSITES

(71) Applicant: Hexion Inc., Columbus, OH (US)

(72) Inventors: Larry Steven Corley, Houston, TX (US); Wilbur Paul Ubrich, Katy, TX (US); Jennifer W. Chung, Katy, TX (US); Amitabh Bansal, Sugar Land, TX (US); Terry Loy, San Clemente, CA (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 16/000,277

(22) Filed: Jun. 5, 2018

(65) Prior Publication Data

US 2018/0355096 A1 Dec. 13, 2018

Related U.S. Application Data

(60) Provisional application No. 62/517,499, filed on Jun. 9, 2017.

(51) Int. Cl.
*C08G 59/17* (2006.01)
*B29C 70/42* (2006.01)
(Continued)

(52) U.S. Cl.
CPC .......... *C08G 59/1466* (2013.01); *B29C 70/42* (2013.01); *B29C 70/52* (2013.01);
(Continued)

(58) Field of Classification Search
CPC ......... B29C 70/42; B29C 70/54; B29C 70/52; C08G 59/02; C08G 59/1466;
(Continued)

(56) References Cited

U.S. PATENT DOCUMENTS

2005/0004270 A1   1/2005   Leskosek et al.
2008/0199717 A1   8/2008   Barker
(Continued)

FOREIGN PATENT DOCUMENTS

CN   102337007   2/2012
CN   102504205   6/2012
(Continued)

OTHER PUBLICATIONS

The Dow Chemical Company, "VORANOLTM 8000LM", 2016 (Year: 2016).*
(Continued)

*Primary Examiner* — David T Karst

(57) ABSTRACT

Compositions and methods for forming epoxy resin systems are provided. In one embodiment, a composition is provided for an epoxy resin system including a liquid epoxy resin component including a liquid epoxy resin and an acrylate monomer, a curing agent component including a compound having an imidazole group and, optionally, a co-curing agent for the compound having an imidazole group comprising a phenolic monomer compound, a branched chain carboxylic acid, and combinations thereof, and a non-aromatic polyol compound. The composition may be used to form composites, such as used in commercial wind turbine blade manufacturing.

17 Claims, 3 Drawing Sheets

(51) Int. Cl.
  *B29C 70/52* (2006.01)
  *B29C 70/54* (2006.01)
  *C08G 59/02* (2006.01)
  *C08G 59/68* (2006.01)
  *C08J 5/04* (2006.01)
  *C08L 63/00* (2006.01)
  *F03D 1/06* (2006.01)
  *C08L 33/08* (2006.01)
  *C08L 71/02* (2006.01)
  *B29K 63/00* (2006.01)
  *B29K 105/08* (2006.01)
  *B29L 31/08* (2006.01)

(52) U.S. Cl.
  CPC .............. *B29C 70/54* (2013.01); *C08G 59/02* (2013.01); *C08G 59/686* (2013.01); *C08J 5/04* (2013.01); *C08L 63/00* (2013.01); *B29K 2063/00* (2013.01); *B29K 2105/0809* (2013.01); *B29L 2031/085* (2013.01); *C08J 2363/00* (2013.01); *C08J 2433/06* (2013.01); *C08J 2471/02* (2013.01); *F03D 1/0675* (2013.01); *F05B 2230/20* (2013.01); *F05B 2240/2211* (2013.01); *F05B 2280/4003* (2013.01)

(58) Field of Classification Search
  CPC ....... C08G 59/686; C08J 5/04; C08J 2363/00; C08J 2433/06; C08J 2471/02; C08L 63/00; C08L 33/08; C08L 71/02; B29K 2063/00; B29K 2105/0809; B29L 2031/085; F03D 1/0675; F05B 2230/20; F05B 2240/2211; F05B 2280/4003
  USPC .......................................................... 528/94
  See application file for complete search history.

(56) References Cited

U.S. PATENT DOCUMENTS

| | | |
|---|---|---|
| 2008/0219851 A1 | 9/2008 | Althoff et al. |
| 2009/0087318 A1 | 4/2009 | Althoff et al. |
| 2010/0104832 A1 | 4/2010 | Messe et al. |
| 2010/0227981 A1 | 9/2010 | Chiba et al. |
| 2010/0292415 A1 | 11/2010 | Reynolds et al. |
| 2011/0184092 A1 | 7/2011 | Schaal et al. |
| 2011/0319564 A1 | 12/2011 | Corley et al. |
| 2012/0156546 A1 | 6/2012 | Amano et al. |
| 2012/0328811 A1 | 12/2012 | Patel et al. |
| 2013/0131217 A1 | 5/2013 | Karunakaran et al. |
| 2013/0281576 A1 | 10/2013 | Kobayashi et al. |
| 2014/0187676 A1 | 7/2014 | Lee et al. |
| 2014/0243453 A1 | 8/2014 | Mizumura et al. |
| 2014/0323613 A1 | 10/2014 | Koers et al. |
| 2015/0099829 A1 | 4/2015 | Hong et al. |
| 2015/0162110 A1* | 6/2015 | Li ................ C08G 59/226 428/375 |
| 2015/0175760 A1 | 6/2015 | Ishimoto et al. |
| 2015/0218299 A1 | 8/2015 | Xie et al. |
| 2015/0368457 A1 | 12/2015 | Klamo et al. |
| 2016/0244552 A1 | 8/2016 | Corley et al. |
| 2016/0257811 A1 | 9/2016 | Feng et al. |
| 2016/0280846 A1 | 9/2016 | Karunakaran et al. |
| 2016/0362546 A1 | 12/2016 | Hasegawa et al. |

FOREIGN PATENT DOCUMENTS

| | | | |
|---|---|---|---|
| CN | 104745132 | 7/2015 | |
| CN | 105331045 | 2/2016 | |
| CN | 106189087 | 12/2016 | |
| CN | 106189493 | 12/2016 | |
| CN | 106281171 | 1/2017 | |
| JP | H01266123 | 10/1989 | |
| JP | 2015218259 | 12/2015 | |
| WO | WO1995/018183 | 7/1995 | |
| WO | WO-2015094629 A1 * | 6/2015 | ............... C08J 3/24 |
| WO | WO2016047357 | 3/2016 | |
| WO | WO2016197305 | 12/2016 | |

OTHER PUBLICATIONS

The Dow Chemical Company, "VORANOL™ 8000LM Safety Data Sheet", 2018 (Year: 2018).*
Hexion, "Technical Data Sheet EPON Resin 825", Oct. 16, 2020 (Year: 2020).*
Hexion, "Technical Data Sheet EPON Resin 826", Oct. 16, 2020 (Year: 2020).*
Hexion, "Technical Data Sheet EPON Resin 828", Oct. 16, 2020 (Year: 2020).*
Hexion, "Technical Data Sheet EPON Resin 862", Oct. 16, 2020 (Year: 2020).*

* cited by examiner

EPOXY RESIN SYSTEMS FOR COMPOSITES

RELATED APPLICATION DATA

This application claims benefit to U.S. Provisional Application No. 62/517,499, filed Jun. 9, 2017, of which the entire contents of the application are incorporated by reference herein.

FIELD OF THE INVENTION

The present invention relates to curing compositions for epoxy resin systems and to epoxy resins prepared utilizing the curing composition. The present invention also relates to methods of preparing epoxy resin systems and to articles made therefrom. The epoxy resin systems of the invention include a curing agent containing at least a compound having an imidazole group.

BACKGROUND OF THE INVENTION

Epoxy resin systems are used in the manufacturing of various articles, including composites. Examples of articles that are being evaluated for manufacturing from epoxy resin systems include windmill blades and windmill blade components. Fabricating windmill blades includes a number of requirements for effective manufacturing especially when a pultrusion manufacturing process is used.

Epoxy pultrusion systems cured with amines typically can be pultruded only at low to very low rates if at all without buildup of cured resin on the die surface, after referred to as "sloughing". The cured resin could "gouge" the surface of the less fully cured resin in the pultruded stock itself, leading to surface imperfections, displacement of the reinforcing fibers, increased pull load requirements, and ultimately breakage of the fiber bundle. Epoxy systems cured with anhydrides often can be made to pultrude better than those cured with amines. However, such systems have the general disadvantages of anhydride-cured epoxy systems including hydrolytic sensitivity at elevated temperatures and irritating and allergenic properties of the anhydride vapors released during high-temperature processing.

In light of the above, there is a need in the art for curing agents for producing epoxy resin systems which alleviate the sloughing problem in prior art epoxy resin systems (especially prior art non-anhydride-cured systems), enabling pultrusion at much higher rates than prior systems without sloughing and with good surface quality when compared to the prior art resin compositions.

SUMMARY OF THE INVENTION

In one aspect, the invention is a composition including an epoxy resin system, which system includes a liquid epoxy resin component including a liquid epoxy resin and an acrylate monomer, a curing agent component including a compound having an imidazole group and, optionally, a co-curing agent (for the compound having an imidazole group) comprising a phenolic monomer compound, a branched chain carboxylic acid, and combinations thereof, and a non-aromatic polyol compound. The epoxy resin system may be free of anhydride compounds, free of radical initiators, free of core-shell rubbers, or combinations thereof. A composite may be made from the epoxy resin system.

In another embodiment, a method is provided for manufacturing a composite, including providing a reinforcing fiber substrate, mixing an epoxy resin system, which system includes a liquid epoxy resin component including a liquid epoxy resin and an acrylate monomer, a curing agent component including a compound having an imidazole group and, optionally, a co-curing agent (for the compound having an imidazole group) comprising a phenolic monomer compound, a branched chain carboxylic acid, and combinations thereof, and a non-aromatic polyol compound, contacting the reinforcing fiber substrate with the epoxy resin system, and curing the epoxy resin system to form the composite. The epoxy resin system may be free of anhydride compounds, free of radical initiators, free of core-shell rubbers, or combinations thereof.

DESCRIPTION OF THE FIGURES

The following is a brief description of figures wherein like numbering indicates like elements.

DETAILED DESCRIPTION OF THE INVENTION

Figure 1:
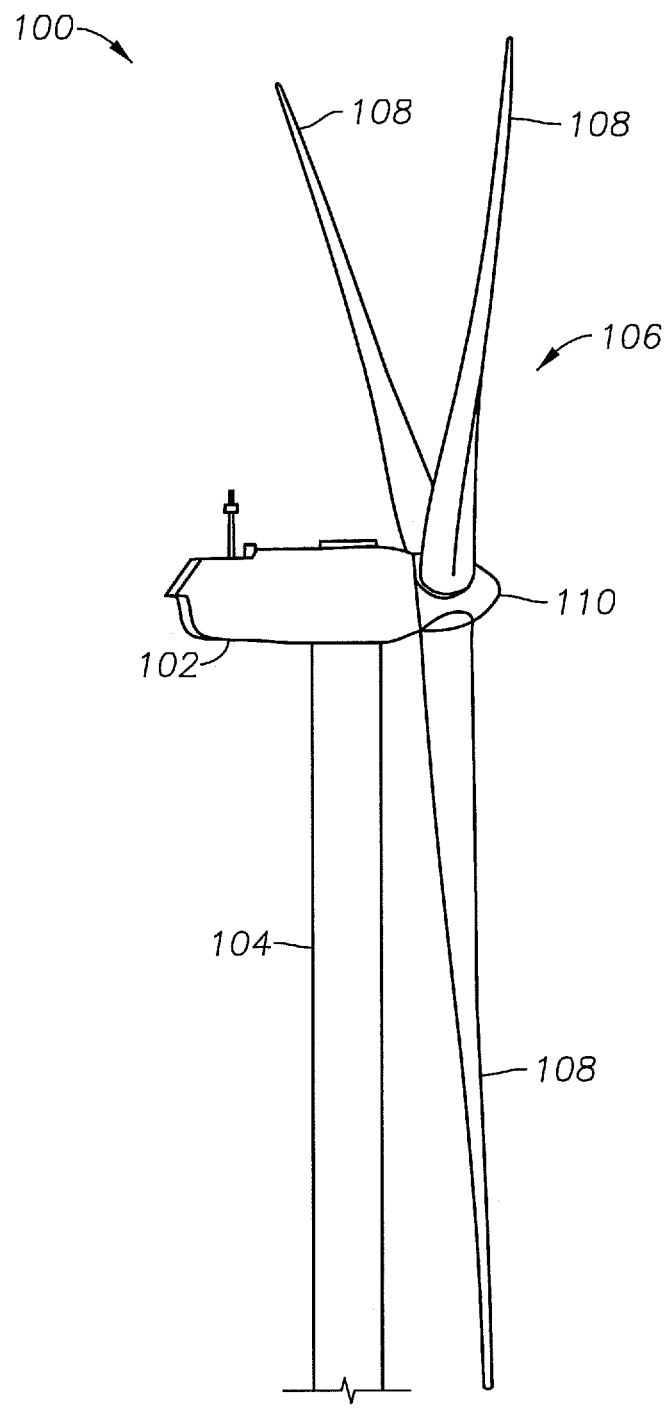
FIG. 1 is a drawing of an exemplary configuration of a wind turbine.

The epoxy resin system of the invention includes a liquid epoxy resin component including a liquid epoxy resin and an acrylate monomer, a curing agent component including a compound having an imidazole group and, optionally, a co-curing agent (for the compound having an imidazole group) comprising a phenolic monomer compound, a branched chain carboxylic acid, and combinations thereof, and a non-aromatic polyol compound. The epoxy resin system may be free of anhydride compounds, free of radical initiators, free of core-shell rubbers, or combinations thereof. The invention comprises the use of one or more compounds having an imidazole group as curing agents for epoxy resins, especially in composites applications. The curing agent may further use primary and/or secondary amines in addition to the compound having an imidazole group.

In comparison with prior art systems based on mixtures of epoxy resins with stoichiometric quantities of primary and/or secondary amines or catalytic quantities of imidazoles, the epoxy resin systems described herein have unexpectedly and surprisingly provided the advantages of invention by alleviating the sloughing problem, enabling pultrusion at much higher rates than prior systems without sloughing and with good surface quality.

The epoxy resin systems of the invention include a liquid epoxy resin component. Epoxy resins are those compounds containing at least one vicinal epoxy group. The epoxy resin may be saturated or unsaturated, non-aromatic, aromatic or heterocyclic and may be substituted. A liquid epoxy resin is defined as an epoxy resin with a viscosity below 100 Pa-s at 25° C. The liquid epoxy resin may also be monomeric or polymeric. The liquid epoxy resin component comprises from about 45 percent by weight (wt. %) to about 98.5 wt. %, such as about 60 wt. % to about 98.5 wt. % of the epoxy resin system.

In one embodiment, the epoxy resin component may be prepared by reacting an epihalohydrin, such as epichlorohydrin, with a compound containing at least one, two or more, hydroxyl groups under basic conditions, such as in an alkaline reaction medium or in the presence of a suitable base.

Examples of such suitable liquid epoxy resins include, but are not limited to, polyglycidyl ethers of poly- or dihydric phenols, polyglycidyl ethers of glycols or polyglycols, epoxy novolacs, other glycidated polyphenol resins, polyglycidyl esters of polycarboxylic acids, fusion reaction products between the epoxy resins and additional polyhydric phenolic compounds such as those disclosed and described in U.S. Pat. Nos. 3,477,990 and 4,734,468, and combinations thereof.

Examples of suitable phenolic compounds used in preparing the liquid epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl) cyclohexane, 2,6,2',6'-tetrachloro-p, p'-bisphenol A, 2,6,2', 6'-tetrabromo-p,p'-bisphenol A, 2,6,2',6'-tetramethyl-3,5,3'-tribromo-p-p'-biphenol, 2,6,2',6'-tetramethyl-3,5,3',5'-tetrabromo-p,p'-biphenol, tetramethylbiphenol, 1,5-dihydroxynaphthalene, bis(2-hydroxy-1-naphthyl)methane, bis(4-hydroxyphenyl) sulfone, bis(4-hydroxyphenyl) ether and the like and combinations thereof. Preferred epoxy resins are aromatic or non-aromatic epoxy resins based on bisphenol A, bisphenol F, phenolic novolacs, hydrogenated bisphenol A, non-aromatic diols, or combinations thereof.

Commercial examples of suitable liquid epoxy resins include, but are not limited to, EPON™ Resins 825, 826, 828, 860, and 862 commercially available from Hexion Inc., of Columbus, Ohio.

In another embodiment, the liquid epoxy resin component may contain a monofunctional or multifunctional epoxy diluent as a viscosity reducer. Suitable diluents include monoglycidyl ethers of alcohols or polyglycidyl ethers of non-aromatic glycols or triols or polyols, or polyglycols. The additive may be a monofunctional epoxy additive, which may also include monoglycidyl esters.

In another embodiment, the liquid epoxy resin component optionally includes an acrylate material, such as an acrylate monomer containing one or more reactive acrylate double bonds. Except when otherwise described herein in specificity, an acrylate monomer refers to an acrylate or a methacrylate. In one implementation of the invention, an acrylate monomer may be a combination of monomers of an acrylate or a methacrylate. Suitable acrylate monomers include an acrylate ester of a mono-ol or polyol, a methacrylate ester of a mono-ol or polyol, or a combination thereof. Alternatively, the acrylate material may be a polyacrylate or polymethacrylate ester of a polyol which contains more than one terminal acrylate or methacrylate group. Preferred esters are the acrylic and methacrylic acid esters of non-aromatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these esters with each other or with their partially esterified analogs. Other preferred esters include monoacrylate or monomethacrylate esters of an alcohol or polyol.

Examples of suitable acrylate materials are acrylate or methacrylate esters of polyols including, and are not limited to, trimethylolpropane triacrylate, trimethylolethane triacrylate, trimethylolpropane trimethacrylate, trimethylolethane trimethacrylate, neopentyl glycol diacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and combinations thereof. Particularly preferred acrylate or methacrylate esters of polyols are trimethylolpropane triacrylate, pentaerythritol tetraacrylate, neopentyl glycol diacrylate, and combinations thereof. Additional acrylate or methacrylate esters of polyols are the acrylate or methacrylate esters of epoxide resins, wherein epoxide resins as used herein are considered to be polyols.

When present in the liquid epoxy resin component, the optional acrylate material, such as an acrylate ester of a mono-ol or polyol, a methacrylate ester of a mono-ol or polyol, or a combination thereof, may be blended with the epoxy resin component from about 1 percent by weight (wt. %) to about 50 wt. %, such as from about 5 wt. % to about 40 wt. %, for example from about 10 wt. % to about 40 wt. % or from about 20 wt. % to about 40 wt. %, of the liquid epoxy resin component.

The epoxy resin system may include a non-aromatic polyol compound. The non-aromatic polyol compound may comprise a glycol having a number average molecular weight between about 1000 and 10000 (daltons).

Examples of suitable glycols include poly(ethylene oxide) glycol, poly(propylene oxide) glycol, poly(butylene oxide) glycol, polytetrahydrofuran glycols, poly(ethylene adipate) glycol, poly(propylene sebacate) glycol, poly(hexamethylene carbonate) glycol, silicone-alkylene oxide copolymer, poly(butadiene-co-acrylonitrile) glycol, and combinations thereof. One example of a silicone-alkylene oxide copolymer is SILWET™ L-7230 copolymer.

The non-aromatic polyol compound may comprise from about 0.5 percent by weight (wt. %) to about 20 wt. %, such as from about 1 wt. % to about 15 wt. % of the epoxy resin system. The non-aromatic polyol compound may be introduced separately from the other components, or may be introduced as part of the epoxy resin component, the curing agent component, or both. When used as part of the epoxy resin component, the non-aromatic polyol compound may comprise from about 1 percent by weight (wt. %) to about 50 wt. %, such as from about 5 wt. % to about 35 wt. % of the epoxy resin component. When used as part of the curing agent component, the non-aromatic polyol compound may comprise from about 5 percent by weight (wt. %) to about 95 wt. %, such as from about 10 wt. % to about 75 wt. % of the curing agent component.

The epoxy resin systems of the invention include a curing agent component containing at least a compound having an imidazole group. Optionally a co-curing agent may be used in combination with the compound having an imidazole group, suitable co-curing agent for the compound having an imidazole group include a phenolic material compound, a (one or more) branched chain carboxylic acid, or a combination thereof. The curing agent component may further (optionally) include one or more multifunctional or monofunctional non-aromatic or aromatic primary or secondary amines. The curing agent component comprises from about 0.5 percent by weight (wt. %) to about 20 wt. %, such as from about 1 wt. % to about 15 wt. % of the epoxy resin system, for example, from about 1 wt. % to about 7 wt. % of the epoxy resin system.

The compound having an imidazole group may be represented by the formula

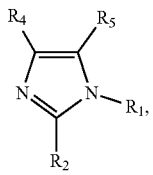

where $R_1$, $R_2$, $R_4$, and $R_5$ can each independently be a hydrogen atom, an alkyl group, or an aryl group. If $R_1$, $R_2$, $R_4$, and $R_5$, are all hydrogen atoms, then the compound is imidazole. Each alkyl group or aryl group may be substituted or unsubstituted, and may have from 1 to 12 carbon atoms, such as from 1 to 6 carbon atoms. Alternatively, $R_1$ and $R_2$, $R_1$ and $R_5$ or $R_4$ and $R_5$ may be part of a non-aromatic ring structure. $R_4$ and $R_5$ may alternatively be part of a monocyclic aromatic or polycyclic aromatic ring structure, such as in benzimidazole.

Suitable compounds having an imidazole group may include one or more compounds selected from the group consisting of imidazole, 1-methylimidazole, 2-methylimidazole, 4(5)-methylimidazole, 2-propylimidazole, 2-ethyl-4-methylimidazole, 2-phenylimidazole, benzimidazole, toluimidazole, and combinations thereof.

If the compounds having an imidazole group are the sole curing agent component, 100 wt. %, the compounds having an imidazole group comprise from about 0.5 percent by weight (wt. %) to about 20 wt. %, such as from about 1 wt. % to about 15 wt. % of the epoxy resin system, for example, from about 1 wt. % to about 7 wt. % of the epoxy resin system. For example, if a liquid imidazole, such as some grades of 2-propylimidazole, are used in the curing agent, and any polyol is added with the epoxy resin component, then the compound having an imidazole group may comprise up to 100% by weight of the curing agent component. If the compounds having an imidazole group are not the sole curing agent component, compounds having an imidazole group may comprise from about 10 percent by weight (wt. %) to about 80 wt. %, such as from about 10 wt. % to about 50 wt. % of the curing agent component.

Suitable branched chain carboxylic acids are one or more monofunctional or multifunctional non-aromatic or aromatic branched chain carboxylic acids. Branched chain carboxylic acids are non-linear chain carboxylic acids having 2 or more methyl terminal groups of a branched structure. Branched carboxylic acids are believed to have crystallization-resistant properties. One example of a branched structures is 2-ethylhexanoic acid. Preferred branched chain carboxylic acids have 5 to 40 carbon atoms. Preferred branched chain carboxylic acids include carboxylic acid mixtures containing a large number of different branched structures such as neo acids including neononanoic acids and neodecanoic acids, such as VERSATIC™ 10 Acid. Examples of suitable brached chain carboxylic acids include 2-ethylhexanoic acid, neoheptanoic acid, neononanoic acid, neodecanoic acid, neotridecanoic acid, isostearic acid, dimerized unsaturated fatty acids, and combination thereof. Preferred neo-acids are those containing multiple highly branched neo-acid isomers, and highly-branched is defined as isomers of neo-acids having at least 5 methyl groups, such as neononanoic acids and neodecanoic acids. The branched chain carboxylic acids, when utilized, may be present in an amount from about 10 percent by weight (wt. %) to about 80 wt. %, such as from about 20 wt. % to about 80 wt. % of the curing agent component.

Phenolic materials comprise materials having two or more phenolic groups. Suitable phenolic materials include phenol resins, phenolic monomers, and combinations thereof. Suitable phenolic monomers may include benzenediols, bisphenols, and combinations thereof. A benzenediol is a compound having two phenol groups on the same aromatic ring. Suitable phenol resins include a phenol-formaldehyde novolac, an alkoxylated phenol-formaldehyde novolac, a resorcinol-formaldehyde novolac, and combinations thereof. Examples of suitable benzenediols and bisphenols include bisphenol A, bisphenol F, tetramethylbisphenol F, 4,4'-sulfonyldiphenol, resorcinol, 4-hexylresorcinol, hydroquinone, and combinations thereof. The phenolic materials, when utilized, may be present in an amount from about 10 percent by weight (wt. %) to about 80 wt. %, such as from about 20 wt. % to about 80 wt. % of the curing agent component.

In one embodiment of the invention, if an imidazole, a carboxylic acid, and a phenolic material were all used, each would be present in an amount from 10 wt. % to 80 wt. % of such compounds with the total weight percent being 100 wt. % imidazoles, carboxylic acids and phenolic materials.

In another embodiment of the curing agent component, the curing agent component may further include an amine, such as one or more primary amines or secondary amines. The primary amines or secondary amines may be multifunctional or monofunctional amines and may be non-aromatic or aromatic amines. The primary amine may have one or more primary amine groups, such as a diamine with two primary amine groups; and the secondary amine may have at least one secondary amine group and one or more primary amine groups or secondary amine groups.

A suitable polyether amine (poly(propylene oxide) diamine) may have the formula: $H_2NCH(CH_3)CH_2[OCH_2CH(CH_3)]_XNH_2$, where X is the number of repeating ether groups of the polyether amine backbone and X may be from 1 to 70 in number, for example, 2.5, 6.1, 33, or 68. Non-integer numbers of X represent the average value over the molecular weight distribution of a compound. Examples of commercial polyether amines are Jeffamine™ polyetheramines, such as Jeffamine™ D-230 available from Huntsman, Inc., of The Woodlands, Tex. Alternatively, the polyether amine described above may have one or more of the amine groups substituted with a hydrogen atom or an organic functional group, such as an ethyl group.

The monoprimary amine may have two carbons or more, and may be a cyclic monoprimary amine. Suitable monoprimary amines for use in the compositions described herein may include, and are not limited to, N-(3-aminopropyl)morpholine, benzylamine, α-methylbenzylamine, phenethylamine, cyclohexylamine, benzhydrylamine, and combinations thereof.

A diamine may include a linear diamine compound or a cyclic diamine compound, such as isophoronediamine. Examples of diamines that may be used include isophoronediamine (IPDA), 1,3-bis(aminomethyl)benzene, 1,2-diaminocyclohexane, 1,6-hexanediamine, 1,2-ethanediamine, 2-methyl-1,5-pentanediamine, aminoethylethanolamine, and combinations thereof.

The polyamine may be a non-aromatic primary or secondary polyamine. Examples of such non-aromatic primary or polyamines include diethylenetriamine, triethylenetetramine, tetraethylenepentamine, and combinations thereof, among others.

The amine, when utilized, may be present in an amount from about 1 percent by weight (wt. %) to about 90 wt. %, such as from about 5 wt. % to about 85 wt. % of the curing agent component. The amine, when utilized, may be present in an amount from about 0.1 percent by weight (wt. %) to about 30 wt. %, such as from about 1 wt. % to about 5 wt. % of the epoxy resin system. In one embodiment of the invention, if an imidazole, a carboxylic acid, an amine and a phenolic material were all used, each would be present in an amount from 1 wt. % to 80 wt. % of such compounds with the total weight percent being 100 wt. % imidazoles, carboxylic acids, amines, and phenolic materials.

If additives are not used, the epoxy resin system may comprise:
1. from about 60 wt. % to 98.5 wt. % of liquid epoxy resin component,
2. from about 1 wt. % to 20 wt. % of curing agent component, and
3. from about 0.5 wt. % to 20 wt. % of the non-aromatic polyol compound.

In another embodiment, the composition may further include one or more additives selected from the group consisting of inorganic fillers, organic fillers, inorganic fibers, organic fibers, and combinations thereof. The fillers may be added in an effective amount to facilitate pultrudability. Examples of suitable additives are clay, silica, glass microspheres, ceramic particles, talc, and combinations thereof.

In another embodiment, the composition may further include one or more additives selected from the group consisting of an accelerator, a toughening agent, a viscosity modifying agent, and combinations thereof. Alcohols, polyols or other hydroxyl compounds may be potentially used as pultrusion processing aids or accelerators for an imidazole containing curing component. Amides, sulfonamides, imides or hydrazides can be also optionally used as accelerators. Examples of toughening agents used with epoxy resins include carboxyl-terminated poly(butadiene-co-acrylonitrile) rubbers, polyurethane rubbers, amine-terminated rubbers, thermoplastics, and combinations thereof. Examples of viscosity (rheology) modifying agents could include monoepoxy and some polyepoxy diluents of the HELOXY™ series (from Hexion Inc., of Columbus, Ohio), fumed silica, delaminated clays treated with quaternary ammonium compounds, anionic polymers, and combinations thereof.

The additives, when utilized, may be present in an amount from about 0.1 percent by weight (wt. %) to about 25 wt. %, such as from about 1 wt. % to about 15 wt. % of the epoxy resin system.

If additives are used, the epoxy resin system may comprise:
4. from about 45 wt. % to 98.4 wt. % of liquid epoxy resin component,
5. from about 1 wt. % to 20 wt. % of curing agent component,
6. from about 0.5 wt. % to 20 wt. % of the non-aromatic polyol compound, and
7. from about 0.1 wt. % to 25 wt. % of additives.

The epoxy resin system may be free of anhydride compounds, free of radical initiators, free of core-shell rubbers, or combinations thereof.

Anhydride compounds as defined herein include both anhydrides and acid anhydrides as understood by one skilled in the art.

Radical initiators as defined here are chemical compounds used to initiate polymerization by which a polymer forms by the successive addition of free-radical building blocks. Also referred to as radical polymerization initiators, the radical initiators may be any known to those skilled in the art. For example, the radical initiators may be thermal radical initiator (i.e., an initiator which generates free radicals on heating), a UV radical initiator (i.e., an initiator which generates free radicals by UV light absorption), or a combination thereof. Examples of radical initiators include camphorquinone, azonitriles such as AIBN (2,2'-azobis(isobutyronitrile), azobiscyclohexanecarbonitrile, 2,2'-azobis(2,4-dimethylvaleronitrile), peroxides, peroxyalkanoates, persulfates, phenyl acetophenones, and phenyl ketones, among others.

Core-shell rubbers (core-shell polymers) are polymers comprising a rubber particle core formed by a polymer comprising an elastomeric or rubbery polymer as a main ingredient, optionally having an intermediate layer formed with a monomer having two or more double bonds and coated on the core layer, and a shell layer formed by a polymer graft polymerized on the core. The shell layer partially or entirely covers the surface of the rubber particle core by graft polymerizing a monomer to the core. Core-shell rubber materials as known in the art.

It has been surprising and unexpectedly found that the use of the curing agent with a compound having an imidazole and a polyol provides for reduced sloughing at increase pultrusion speeds.

In order to provide a better understanding of the present invention including representative advantages thereof, the following examples are offered. It is understood that the examples are for illustrative purposes and should not be regarded as limiting the scope of the invention to any specific materials or conditions.

The epoxy resin systems described herein may be used for the manufacturing of composites. Composites may be formed by applying a curable epoxy resin composition to a substrate or a reinforcing material, such as by impregnating, infusing, molding, or coating the substrate or reinforcing material, and curing the curable composition. Curing of the curable compositions disclosed herein may require a temperature of up to about 250° C., such as at a temperature from 30° C. to about 120° C., for example, about 70° C., for periods of seconds up to hours, depending on the epoxy resin system components. The above described epoxy resin systems may be in the form of a powder, a slurry, or a liquid. After a curable epoxy resin system has been produced, as described above, it may be disposed on, in, or between the described substrates, before or during cure of the curable composition.

In one embodiment, a composite may be made by a pultrusion process of providing a reinforcing fiber substrate, mixing an epoxy resin system from a composition comprising an epoxy resin component and a curing agent component plus optional filler and release agent as described herein, contacting the reinforcing fiber substrate with the epoxy resin system, such as passing the reinforcing fiber substrate through an impregnation station, for example, an impregnation bath or resin injection chamber, and then through a heated die curing the epoxy resin system to form the composite, and pulling the fiber reinforced composite article.

The reinforcing fiber substrate may comprise fibers and or fabrics of organic materials, such as polymeric materials, inorganic materials, such as glass, ceramics, metal-containing fibers, or combinations thereof, and combinations of organic or inorganic materials. The fibers may include aramid, polybenzimidazole, carbon/graphite, boron, quartz, aluminum oxide; glass, such as E-glass (electrical glass), S glass, S-2 GLASS® material, C glass, or basalt glass; silicon carbide or silicon carbide fibers containing titanium, and combinations thereof. The fibers may have a random orientation, or be unidirectional fibers or +/−45° direction fibers, such as unidirectional or +/−45° direction E-glass fibers. Examples of commercially available fibers may include organic fibers, such as KEVLAR™, aluminum oxide-containing fibers, such as NEXTEL™ fibers from 3M, silicon carbide fibers, such as NICALON™ from Nippon Carbon, and silicon carbide fibers containing titanium, such as TYRANNO™ from Ube.

The fabrics may be made of woven or non-woven fibers as described herein. The fabrics may be composed of fibers having multiple directions including 0°, 0°/90°, +/−45° direction fibers, random orientations, or other orientations. The fabrics may be of two or more layers of fibers.

The substrate may be a monolayer or a multi-layer material structure. For example, the substrate may be a composite of two alloys, a multi-layered polymeric article, and a metal-coated polymer, among others, for example. In other various embodiments, one or more layers of the curable composition may be disposed on a substrate.

The epoxy resin systems described herein may be used for fiber reinforced substrates described herein. In one embodiment, the fiber reinforced substrates comprise high strength filaments or fibers of carbon (graphite), glass, boron, and the like. Composites may contain up to about 75 vol. %, such as from about 55 wt. % to about 65 wt. %, of these fibers based on the total volume (vol %) of the composite. For example, the fibers of the composite may comprise about 60 vol % continuous uni-directional E-glass fibers or comprise up to about 65 vol % continuous +/−45° direction E-glass fibers.

The pultrusion composite may be any shape and any dimensions based on the pultrusion die. Examples of suitable dimensions include rectangular interior cross section from about 0.0625 (1/16") inches (1.5875 mm) to 4 inch (101.2 mm), such as from about 0.125 inches (3.175 mm) to 1 inch (25.4 mm), in thickness and 0.25 inches (6.35 mm) to 36 inches (914.4 mm) in width. Alternatively, the composites may be in the form of rods having a cross-sectional diameter from 0.25 inches (6.35 mm) to 3 inches (76.2 mm), such as 0.375 inches (3/8"; 9.525 mm), in diameter. In one embodiment, a pultrusion die may have a rectangular interior cross section 25.4 mm wide and 3.25 mm thick. The composites made from the pultrusion die may have any length desired by the operator, for example, from about 0.305 meters to about 150 meters in length depending on the end-product of the composites. In one example, for a spar cap of a windmill blade, the composite may be from about 20 meters to any length as per the blade designs, such as from about 20 meters to about 100 meters in length for most commercial manufacturing of such blades.

EXAMPLES

Epoxy resin systems described herein were formed by providing an epoxy resin component to a mixing device and providing a curing agent component to the mixing device. The product from the mixing device was then provided to a pultrusion device. The present examples were batch-mixed with a blade-type mixer. However, the invention contemplates mixing by other forms, such as in a continuous mixing unit.

A pultrusion apparatus was used with a die and a substrate material, such as glass fiber was threaded through a resin impregnation bath and subsequently through the die. A system of pullers pulled the pultruded rectangular unidirectionally reinforced cross section material out of the die. The die was heated at the temperature indicated. In practice, the resin mixture was poured into the resin impregnation bath and pultrusion was carried out at the indicated speeds. The surface condition of the pultruded material was noted and properties were measured and/or calculated.

The glass transition temperatures ($T_g$) of the cured resins in the Examples were measured by Differential Scanning Calorimetry (DSC) at a heat-up rate of 20° C./minute from 50° C. to 220° C. followed by rapid cooling and a second identical heating rate scan. The midpoint of the curve in which heat capacity ($C_p$) increases from the glass plateau to the rubbery plateau was taken as the $T_g$. The DSC instrument utilized was a TA Instruments DSC Model Q20 and its temperature was calibrated using an indium and a tin standard.

Pull load in the art of pultrusion is generally known by one skilled in the art as the force exerted on a pultruded composite by the pullers pulling the pultruded material out of the die. The machine's pull load was measured by a load cell attached to the floating die station. Generally, the lower the pull load the more efficient the pultrusion process, and at higher pull loads, the pultruded material may slip, become damaged, or simply be incapable of being pulled from the die.

Line speed in the art of pultrusion is generally known by one skilled in the art as rate at which a pultruded material is pulled through the die or, equivalently, the rate in which a substrate, such as fibers, is pulled through a resin impregnation bath or other resin application device.

Thermal properties were measured per ASTM D-3418.

The surface quality was determined by visual inspection based on commercial product evaluations. For such a visual inspection, "good" represents a smooth surface and "sloughing" represents the presence of cured powdered resin and/or concave defects in the pultruded article. "Sloughing" is defined as cured powdered resin deposited on the surface of the pultruded article (stock) as it exits the die, where the cured powdered resin is either removable by simple mechanical means or is irremovable, and is generally accompanied by concave defects (gouged) in the pultruded article.

Short beam shear measurements were conducted per ASTM D-2344 on samples cut from the pultruded sections.

Lap shear adhesion behavior was determined as follows. A specimen of pultruded stock was cut in two and a square adhesive joint was prepared with 25.4 mm length overlap between the sections (which were themselves 25.4 mm in width). The thickness of the adhesive layer between the two sections was 0.61 mm (gap maintained by a wire spacer along the edges of the joint). The adhesive formulation used was the following:

1. 80 parts (61.54 wt. %) EPON™ Resin 828 (see below),
2. 20 parts (15.38 wt. %) HELOXY™ Modifier 66 (1,6-hexanediol diglycidyl ether),
3. 15.6 parts (12.00 wt. %) poly(propylene oxide) diamine of number average molecular weight approximately 240 and amine hydrogen equivalent weight approximately 60,
4. 11.4 parts (8.77 wt. %) isophoronediamine,
5. 2.4 parts (1.85 wt. %) N-(2-aminoethyl)piperazine, and
6. 0.6 parts (0.46 wt. %) cure accelerator mixture, The liquid adhesive mixture was spread between the two sections (gap maintained by wire spacer as above) and then was allowed to cure overnight at room temperature and 8 hours at 80° C. Lap shear testing was then carried out on the adhesive joint according to ASTM D-1002.

Liquid epoxy resin A is a bisphenol F (bisphenol of formaldehyde) diglycidyl ether with an epoxy equivalent weight of 165-173 and a 25° C. viscosity of 2.5-4.5 Pa-s.

Liquid epoxy resin B is a bisphenol A diglycidyl ether with an epoxy equivalent weight of 185-192 and a 25° C. viscosity of 11-15 Pa-s.

Liquid epoxy resin C is a bisphenol F (bisphenol of formaldehyde) diglycidyl ether with an epoxy equivalent weight of 162-167 and a 25° C. viscosity of 2.0-3.0 Pa-s.

Epoxy resin D is a bisphenol A novolac based epoxy resin with an epoxy equivalent weight of 195-230 and a 130° C. viscosity of 1-6 Pa-s.

Viscosity modifier is a diglycidyl ether of neopentyl glycol (2,2-dimethyl-1,3-propanediol) with an epoxy equivalent weight of 130-145 and a 25° C. viscosity of 13-25 mPa-s.

Filler and processing aid clay is a pulverized aluminosilicate kaolin clay with an average particle size of 3.5 µm.

Axel INT-XP-I-107-N1 is a mold release agent of proprietary composition, sold by Axel Plastics Research Laboratories, Inc.

Example 1: Pultrusion of Epoxy Systems Containing Epoxy Resins, an Acrylic Monomer, and an Imidazole, with and without a Polyol A pultrusion apparatus was used with a die 914 mm long with a rectangular interior cross section 25.4 mm wide and 3.25 mm thick. Glass fiber (PPG Hybon 2026-206, 2400 tex, and 59 rovings) was threaded through a resin impregnation bath and subsequently through the die. A system of pullers pulled the pultruded rectangular unidirectionally reinforced cross section out of the die. The die temperature was 230° C. near the die entrance and in the middle and 220° C. near the exit. Different systems containing liquid epoxy resins, trimethylolpropane triacrylate (TMPTA), 2-propylimidazole (curing agent), filler and processing aid and mold release (poly(propylene oxide) glycol of 4000 number average molecular weight or alternatively the commercial mold release blend Axel INT-XP-I-107-N1) were tested in pultrusion. The resin mixture was poured into the resin impregnation bath (with the die at the temperature indicated) and pultrusion was carried out at the indicated speeds. The surface condition of the pultruded part was noted and the glass transition temperature (Tg) of the pultruded part was determined (midpoint by differential scanning calorimetry, DSC). Results are shown in Table 1 below.

With regard to the data expressed in the following Tables 1-7, processes where data was not produced is represented by the abbreviation N/A for "not available". As indicated below, data at least was not produced in experiments in instances where prior runs at lower pultrusion speeds had yielded unacceptable results. Also, if the first pultrusion speed tested with a particular system yielded a pultruded composite with acceptable surface quality, lower speeds were generally then not tested for that particular system.

TABLE 1

| System | 1-1 | 1-2 | 1-3 | 1-4 | 1-5 | 1-6 | 1-7 |
|---|---|---|---|---|---|---|---|
| Liquid epoxy resin A, parts (wt %) | N/A | N/A | 50 (39.68%) | 50 (42.37%) | 50 (39.06%) | 50 (40.81%) | 30 (24.49%) |
| Liquid epoxy resin B, parts (wt %) | 60 (47.62%) | 60 (50.85%) | 30 (23.81%) | 30 (25.43%) | 30 (23.44%) | 30 (24.49%) | 42 (34.28%) |
| Trimethylolpropane triacrylate, parts (wt %) | 40 (31.75%) | 40 (33.90%) | 20 (15.88%) | 20 (16.95%) | 20 (15.63%) | 20 (16.33%) | 28 (22.86%) |
| 2-propylimidazole, parts (wt %) | 6 (4.76%) | 6 (5.08%) | 6 (4.76%) | 6 (5.08%) | 6 (4.69%) | 6 (4.90%) | 6 (4.90%) |
| Axel INT-XP-I-107/N1 (mold release), parts (wt %) | 4 (3.17%) | 1 (0.85%) | 4 (3.17%) | 1 (0.85%) | N/A | N/A | N/A |
| Poly(propylene oxide) glycol 4000, parts (wt %) | N/A | N/A | N/A | N/A | 11 (8.59%) | 5.5 (4.49%) | 5.5 (4.49%) |
| Filler and processing aid clay, parts (wt %) | 16 (12.70%) | 11 (9.32%) | 16 (12.70%) | 11 (9.32%) | 11 (8.59%) | 11 (8.98%) | 11 (8.98%) |
| Line speed 609 mm/min: | | | | | | | |
| Pull load (kN) | 3.31 | N/A | 4.32 | N/A | N/A | N/A | N/A |
| Surface quality (visual) | Good | N/A | Good | N/A | N/A | N/A | N/A |
| Tg, ° C., DSC midpoint | 49.1 | N/A | N/A | N/A | N/A | N/A | N/A |
| Line speed 763 mm/min: | | | | | | | |
| Pull load (kN) | 4.54 | 5.28 | 6.35 | 7.48 | 3.73 | N/A | N/A |
| Surface quality (visual) | Good | Good | Slough | Slough | Good | N/A | N/A |
| Tg, ° C., DSC midpoint | 42.2 | 68.7 | 49.1 | N/A | 78.8 | N/A | N/A |

TABLE 1-continued

| System | 1-1 | 1-2 | 1-3 | 1-4 | 1-5 | 1-6 | 1-7 |
|---|---|---|---|---|---|---|---|
| Line speed 1015 mm/min: | | | | | | | |
| Pull load (kN) | 6.07 | 8.57 | N/A | N/A | 4.50 | 4.72 | 5.13 |
| Surface quality (visual) | Slough | Slough | N/A | N/A | Good | Good | Good |
| Tg, ° C., DSC midpoint | N/A | N/A | N/A | N/A | 82.3 | 89.2 | 80.4 |
| Line speed 1270 mm/min: | | | | | | | |
| Pull load (kN) | N/A | N/A | N/A | N/A | 5.34 | N/A | N/A |
| Surface quality (visual) | N/A | N/A | N/A | N/A | Good | N/A | N/A |
| Tg, ° C., DSC midpoint | N/A | N/A | N/A | N/A | 86.8 | N/A | N/A |
| Line speed 1525 mm/min: | | | | | | | |
| Pull load (kN) | N/A | N/A | N/A | N/A | 7.25 | 7.92 | 8.10 |
| Surface quality (visual) | N/A | N/A | N/A | N/A | Good | Good | Good |
| Tg, ° C., DSC midpoint | N/A | N/A | N/A | N/A | 83.5 | 84.4 | 87.7 |
| Short beam shear stress, MPa | N/A | N/A | N/A | N/A | N/A | N/A | 63.0 |
| Single lap shear adhesion, MPa | N/A | N/A | N/A | N/A | N/A | N/A | 9.62 |

Table 1 above discloses that for a system based on 60 parts of Liquid epoxy resin B and 40 parts of TMPTA, use of the formulated commercial Axel mold release at two levels (prior art systems 1-1 and 1-2) allowed pultrusion only up to a line speed of 763 mm/minute with good (visually smooth) surface quality. At the higher line speed of 1015 mm/minute, the surface showed extensive "sloughing" with fiber rovings displaced from their normal locations and frequently breaking. Such phenomena are unacceptable in most commercial pultruded parts and can sometimes lead to breakage of the entire fiber bundle during an extended pultrusion session. Also, the glass transition temperatures of the two systems (without postcure) were low to very low even at line speeds slow enough to allow good surface quality (42.2° C. and 68.7° C. at a line speed of 763 mm/minute).

The prior art systems #1-3 and 1-4, containing two different epoxy resins and only half the level of TMPTA used in the earlier system, showed sloughing even at a line speed of 763 mm/minute (the systems #1-3 containing more Axel mold release could be pultruded with good surface quality at 609 mm/minute but had a Tg of only 49.1° C. at 763 mm/minute).

In contrast, the systems #1-5 and #1-6 of the present invention, in which the Axel mold release was replaced with 4000 molecular weight poly(propylene oxide) glycol at two different levels, could be pultruded with good surface quality and acceptable Tg (>80° C.) at line speeds of at least 1525 mm/minute. The system #1-7, similar to #1-6 but with a lower level of liquid epoxy resin A and a higher level of trimethylolpropane triacrylate, pultruded with similarly good results. Therefore, the inventive systems having a polyol show a clear improvement over systems that do not.

Example 2: Pultrusion of Epoxy Systems Containing Epoxy Resins, an Acrylic Monomer, and an Imidazole, at Different Levels of a Polyol The systems in Table 2 below were used in pultrusion by the same procedure as in Example 1. The data in Table 2 show that pultruded sections of good surface quality could be obtained at a pultrusion speed of 1015 mm/min at levels as low as 2 parts of polypropylene glycol 4000 per hundred parts of epoxy/acrylic component (1.68% by weight of total system) as described in system 2-4. However, the pull load at the lowest level of polypropylene glycol 4000 was considerably higher than the pull load at the higher polypropylene glycol 4000 levels at the same pultrusion speed. A higher pull load requires more work by the pultruder system for the same amount of product and is undesired.

TABLE 2

| System | 2-1 parts (wt %) | 2-2 parts (wt %) | 2-3 parts (wt %) | 2-4 parts (wt %) |
|---|---|---|---|---|
| Liquid epoxy resin A | 50 (39.06%) | 50 (40.81%) | 50 (41.32%) | 50 (42.02%) |
| Liquid epoxy resin B | 30 (23.44%) | 30 (24.49%) | 30 (24.79%) | 30 (25.21%) |
| Trimethylolpropane triacrylate | 20 (15.63%) | 20 (16.33%) | 20 (16.53%) | 20 (16.81%) |
| 2-propylimidazole | 6 (4.69%) | 6 (4.90%) | 6 (4.96%) | 6 (5.04%) |
| Poly(propylene oxide) glycol 4000 | 11 (8.59%) | 5.5 (4.49%) | 4 (3.31%) | 2 (1.68%) |
| Filler and processing aid clay | 11 (8.59%) | 11 (8.98%) | 11 (9.09%) | 11 (9.24%) |
| Line speed 1015 mm/min: | | | | |
| Pull load (kN) | 4.50 | 4.72 | 4.50 | 8.08 |
| Surface quality (visual) | Good | Good | Good | Good |
| Tg, ° C., DSC midpoint | 82.3 | 89.2 | 89.5 | 88.2 |
| Short beam shear stress, MPa | N/A | N/A | N/A | 77.9 |
| Single lap shear adhesion, MPa | N/A | N/A | 9.38 | 9.39 |

Example 3: Pultrusion of Epoxy Systems Containing Epoxy Resins, an Acrylic Monomer, a Polyol, and an Imidazole, at Different Levels of Filler and Processing Aid Clay The systems in Table 3 below were used in pultrusion by the same procedure as in Example 1. The data in Table 3 show that pultruded sections of good surface quality could be obtained at a pultrusion speed of 1015 mm/min at all levels of filler and processing aid clay used, with no consistent effect of filler and processing aid level on pull load or on cured glass transition temperature.

TABLE 3

| System | 3-1 parts (wt %) | 3-2 parts (wt %) | 3-3 parts (wt %) | 3-4 parts (wt %) |
| --- | --- | --- | --- | --- |
| Liquid epoxy resin A | 50 (41.32%) | 50 (42.37%) | 50 (43.11%) | 50 (43.86%) |
| Liquid epoxy resin B | 30 (24.79%) | 30 (25.42%) | 30 (25.86%) | 30 (26.32%) |
| Trimethylolpropane triacrylate | 20 (16.53%) | 20 (16.95%) | 20 (17.24%) | 20 (17.54%) |
| 2-propylimidazole | 6 (4.96%) | 6 (5.09%) | 6 (5.17%) | 6 (5.26%) |
| Poly(propylene oxide) glycol 4000 | 4 (3.31%) | 4 (3.39%) | 4 (3.45%) | 4 (3.51%) |
| Filler and processing aid clay | 11 (9.09%) | 8 (6.78%) | 6 (5.17%) | 4 (3.51%) |
| Line speed 1015 mm/min: | | | | |
| Pull load (kN) | 4.50 | 7.89 | 4.58 | 3.12 |
| Surface quality (visual) | Good | Good | Good | Good |
| Tg, °C., DSC midpoint | 89.5 | 90.1 | 87.2 | 88.6 |
| Short beam shear stress, MPa | N/A | N/A | N/A | N/A |
| Single lap shear adhesion, MPa | 9.38 | N/A | N/A | 10.13 |

Example 4: Pultrusion of Epoxy Systems Containing Epoxy Resins, Acrylic Monomers, Imidazoles, and Carboxylic Acids, with or without Polyols 2-Methylimidazole and VERSATIC™ 10 Acid were mixed with liquid epoxy resin A and liquid epoxy resin B, trimethylolpropane triacrylate, filler and processing aid clay, and poly(propylene oxide) glycol 4000 as shown in Table 4 below to formulate systems which were pultruded as in Examples 1 to 4.

TABLE 4

| System | 4-1 parts (wt %) | 4-2 parts (wt %) | 4-3 parts (wt %) | 4-4 parts (wt %) |
| --- | --- | --- | --- | --- |
| Liquid epoxy resin A | 50 (40.81%) | 50 (38.91%) | 50 (38.46%) | 50 (40.16%) |
| Liquid epoxy resin B | 30 (24.49%) | 30 (23.35%) | 30 (23.08%) | 30 (24.10%) |
| Trimethylolpropane triacrylate | 20 (16.33%) | 20 (15.56%) | 20 (15.39%) | 20 (16.06%) |
| 2-methylimidazole | 2 (1.63%) | 4 (3.11%) | 4.5 (3.46%) | 4.5 (3.61%) |
| VERSATIC ™ 10 Acid | 4 (3.27%) | 8 (6.23%) | 9 (6.92%) | 9 (7.23%) |
| Poly(propylene oxide) glycol 4000 | 5.5 (4.49%) | 5.5 (4.28%) | 5.5 (4.23%) | 0 |
| Filler and processing aid clay | 11 (8.98%) | 11 (8.56%) | 11 (8.46%) | 11 (8.84%) |
| Line speed 306 mm/min: | | | | |
| Pull load (kN) | N/A | N/A | N/A | N/A |
| Surface quality (visual) | Good | N/A | N/A | N/A |
| Tg, °C., DSC midpoint | N/A | N/A | N/A | N/A |
| Line speed 610 mm/min: | | | | |
| Pull load (kN) | N/A | N/A | N/A | N/A |
| Surface quality (visual) | Some sloughing | N/A | N/A | N/A |
| Tg, °C., DSC midpoint | N/A | N/A | N/A | N/A |
| Line speed 762 mm/min: | | | | |
| Pull load (kN) | N/A | N/A | N/A | Seized in die on startup |
| Surface quality (visual) | N/A | N/A | N/A | |
| Tg, °C., DSC midpoint | N/A | N/A | N/A | |
| Line speed 1015 mm/min: | | | | |
| Pull load (kN) | 3.14 | 3.78/4.62 | 4.08 | N/A |
| Surface quality (visual) | Severe sloughing | Good | Good | N/A |
| Tg, °C., DSC midpoint | 47.6 (*) | 68-81 | 60.3 | N/A |
| Line speed 1525 mm/min: | | | | |
| Pull load (kN) | N/A | 6.82 | 8.07 | N/A |
| Surface quality (visual) | N/A | Good | Good | N/A |
| Tg, °C., DSC midpoint | N/A | 67-77 | 68.1 | N/A |

* Tg increased to 96.2° C. on second heat in DSC, indicating undercure during pultrusion.

It can be seen from Table above that satisfactory pultruded parts could be obtained at pultrusion speeds up to 1525 mm/min at the two highest levels of 2-methylimidazole used (systems #4-2 and #4-3) but not at the lowest level (insufficient to cure the part fully in the die, system #4-1). The presence of the monocarboxylic acid, however, lowered the glass transition temperature relative to systems in previous examples cured with a liquid grade of 2-propylimidazole. If the polypropylene glycol 4000 was omitted from the formulation (system #4-4), the pultruded part seized in the die on startup and the die had to be taken apart and cleaned.

Example 5: Pultrusion of Epoxy Systems Containing Epoxy Resins, Acrylic Monomers, Imidazoles, a Bisphenol, and a Polyol, Using Carbon Fiber A pultrusion apparatus similar to that in Example 1 was used except that the die temperature was kept at 210° C. near the die entrance and in the middle and 200° C. near the exit. In place of the glass fiber used in the previous examples, 22 rovings of carbon fiber (Zoltek 50K) were used as reinforcement. Imidazole, 2-methylimidazole, resorcinol (phenolic component) and poly(propylene oxide) glycol 4000 were mixed with liquid epoxy resin C and liquid epoxy resin B, trimethylolpropane triacrylate, filler and processing aid clay, and additional poly(propylene oxide) glycol 4000 as shown in Table 6 below.

TABLE 5

| System | 5-1 parts (wt %) |
| --- | --- |
| Liquid epoxy resin C | 75 (57.47%) |

TABLE 5-continued

| System | 5-1 parts (wt %) |
|---|---|
| Liquid epoxy resin B | 15 (11.50%) |
| Trimethylolpropane triacrylate | 10 (7.66%) |
| Imidazole | 1.5 (1.15%) |
| 2-methylimidazole | 1.5 (1.15%) |
| Resorcinol | 1.5 (1.15%) |
| Poly(propylene oxide) glycol 4000 | 6 (4.60%) |
| Filler and processing aid clay | 20 (15.32%) |
| Line speed 762 mm/min: | |
| Pull load (kN) | 3.13 to 4.20 |
| Surface quality (visual) | Good |
| Tg, ° C., DSC midpoint | 96.1 |
| Line speed 1015 mm/min: | |
| Pull load (kN) | 3.97 to 4.35 |
| Surface quality (visual) | Good |
| Tg, ° C., DSC midpoint | 92.9 |
| Line speed 1270 mm/min: | |
| Pull load (kN) | 6.67 |
| Surface quality (visual) | Good |
| Tg, ° C., DSC midpoint | 91.7 |

One can see from Table 5 above that pultrusions with good surface quality and high cured Tg could be obtained with the above resin-curing agent system at pultrusion speeds up to 1270 mm/min at the lower level of total imidazoles used as shown in system 5-1.

Example 6: Pultrusion of Epoxy Systems Containing Epoxy Resins, Non-Aromatic Amines and 2-Propylimidazole A pultrusion apparatus similar to that in Example 1 was used except that the die temperature was kept at 220° C. near the die entrance and in the middle and 210° C. near the exit. Glass fiber was used as in Examples 1-4. Resin systems were prepared in which the epoxy component contained a bisphenol F-based epoxy resin (liquid epoxy resin A), a bisphenol A-novolac based epoxy (epoxy resin D) and a diglycidyl ether of neopentyl glycol (viscosity modifier) used for viscosity reduction. Curing agent was a mixture of 2-propylimidazole, a poly(propylene oxide)diamine and isophoronediamine. Filler and processing aid clay was added and different amounts of a 4000 number average molecular weight poly(propylene oxide) glycol were used. The same fibers were used as in Example 1. Results are shown in Table 6 below.

TABLE 6

| System | 6-1 parts (wt %) | 6-2 parts (wt %) | 6-3 parts (wt %) | 6-4 parts (wt %) |
|---|---|---|---|---|
| Liquid epoxy resin A | 80 (61.88%) | 80 (60.93%) | 80 (60.02%) | 80 (59.13%) |
| Epoxy resin D | 10 (7.73%) | 10 (7.62%) | 10 (7.50%) | 10 (7.39%) |
| Viscosity modifier | 10 (7.73%) | 10 (7.62%) | 10 (7.50%) | 10 (7.39%) |
| 2-propylimidazole | 3 (2.32%) | 3 (2.28%) | 3 (2.25%) | 3 (2.22%) |
| Poly(propylene oxide) diamine of number average molecular weight ~240 and amine hydrogen equivalent weight ~60 | 12 (9.28%) | 12 (9.14%) | 12 (9.00%) | 12 (8.87%) |
| Isophoronediamine | 4.3 (3.33%) | 4.3 (3.27%) | 4.3 (3.23%) | 4.3 (3.18%) |
| Poly(propylene oxide) glycol 4000 | 0 | 2 (1.52%) | 4 (3.00%) | 6 (4.43%) |
| Filler and processing aid clay | 10 (7.73%) | 10 (7.62%) | 10 (7.50%) | 10 (7.39%) |
| Line speed 763 mm/min: | | | | |
| Pull load (kN) | N/A | 4.33 | 4.76 | 6.11 |
| Surface quality (visual) | Sloughing | Less sloughing | Still less sloughing | Very little sloughing |
| Tg, ° C., DSC midpoint | 61.4 | 61.4 | 63.1 | 57.0 |

One can see from Table 6 that as the concentration of the poly(propylene oxide) glycol in the system increased, considerably less surface sloughing occurred in the pultruded part. However, in contrast to the behavior of the systems in earlier examples with the acrylate ester component, surface sloughing was not fully eliminated even at a line speed of only 763 mm/min. Also, the glass transition temperature was considerably lower than that of the highest Tg systems in Examples 1-3 and 5.

The composites formed using the composition described herein may be used to form windmill blade components including spar caps, shear webs, and shell components.

In one embodiment, FIG. 1 shows a wind turbine 100 having a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present disclosure.

Figure 2:
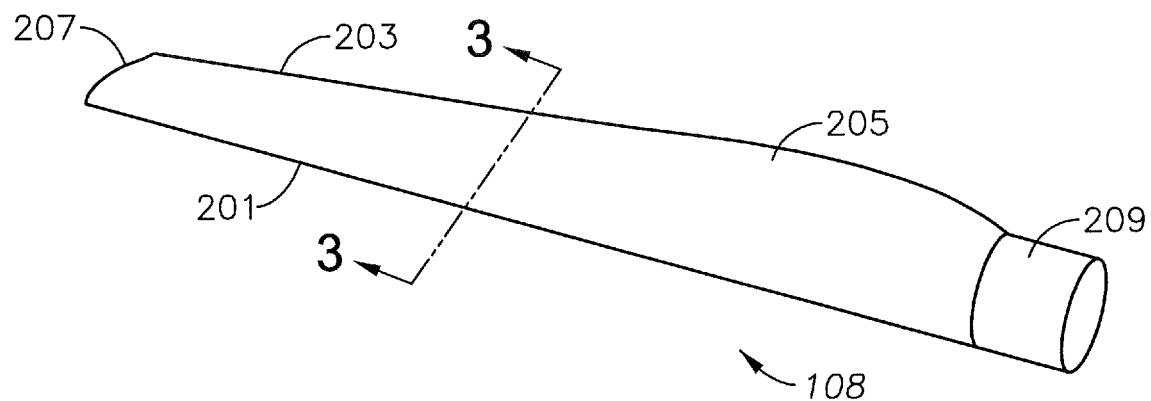
FIG. 2 is a perspective view of a nacelle of the exemplary wind turbine configuration shown in FIG. 1.

FIG. 2 illustrates a turbine blade 108 having a leading edge 201 and a trailing edge 203. The turbine blade 108 includes an airfoil portion 205 extending from the tip 207 to the root 209, which is connectable to the hub 110 of the wind turbine.

Figure 3:
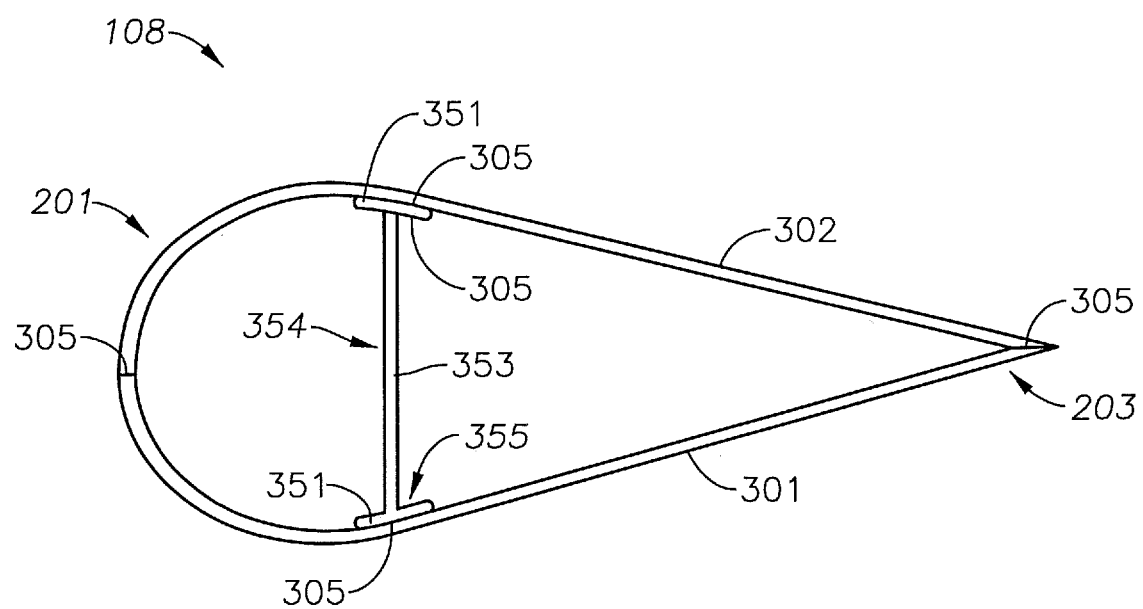
FIG. 3 is a cross-section taken along line 3-3 of FIG. 2 showing a wind turbine blade according to one embodiment of the disclosure.

FIG. 3 illustrates still another embodiment of a wind turbine blade 108 including a shear web 353 between the first shell portion 301 and the second shell portion 302. FIG. 3 includes spar caps 351 perpendicular to the shear web 353. The spar cap 351 includes a composition and structure that provides structural reinforcement for the wind turbine blade 108. Suitable fibers for the spar cap include, but are not limited to, glass, carbon or hybrid fibers. The spar cap 351 may also include resin material including, but not limited to, epoxy, polyester, or vinyl ester resin material. As shown in FIG. 3, the second shell portion 302 is adhered to a first integrated first shell 301 by adhesive joints 305 near each of the leading edge 201 and the trailing edge 203. However, a "T"-shaped shear web 353 is adhered to the first shell portion 301. Attachment of the shear web 353 may be provided by adhesive joints 305 and may, optionally include surface preparation, such as roughening. The shear web 353 includes the spar cap portion 355, which includes the spar cap 351 adhered to the first shell portion 301 and the web portion 354. The shear web 353 is further adhered to the spar cap 351 adhered to the second shell portion 301. The adhesive joints 305 may include adhesives, or may include incorporation into the shell portions 301 or 302 by resin infusion.

In one embodiment, the shell 301 is fabricated as a single component wherein the spar cap portion 355 and the web portion 354 are formed into a unitary composite component by providing a single reinforcing fabric including the web portion 354 and the spar cap portion 355 or by placing a reinforcing fabric for the web portion 354 adjacent to the reinforcing fabric for the spar cap portion 355 and infusing the web portion 354 and spar cap portion 355 together to form a unitary composite component.

The composites described herein may be used in the formation of a full shell or half-shell. In either embodiment, the shell or half-shell may be formed using any suitable composite forming method. Suitable methods include, but are not limited to, resin transfer molding (RTM), vacuum assisted resin transfer molding (VARTM), resin infusion method (RIM) or any other suitable resin infusion method for forming fiber reinforced composites.

Figure 4:
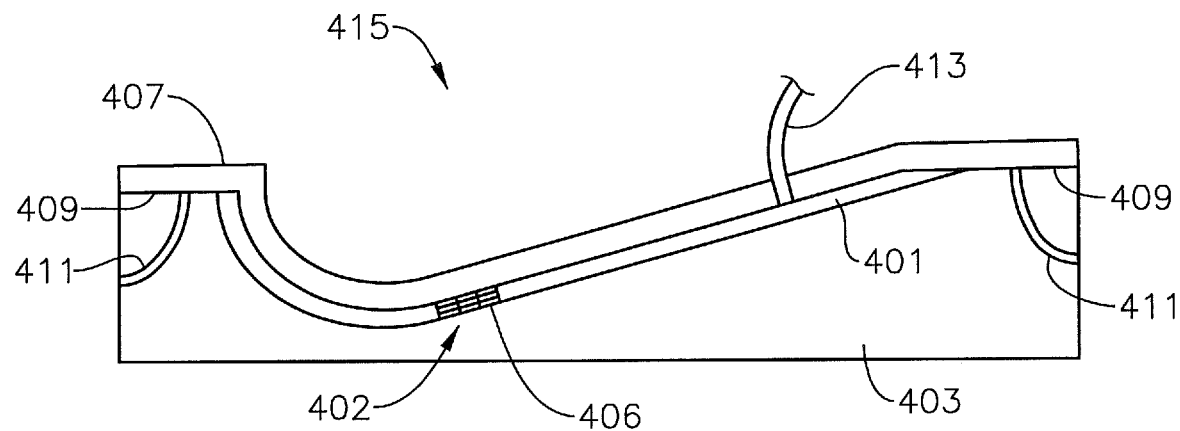
FIG. 4 is a cross-sectional view of an apparatus for making a wind turbine blade according to an embodiment of the disclosure.
Figure 5:
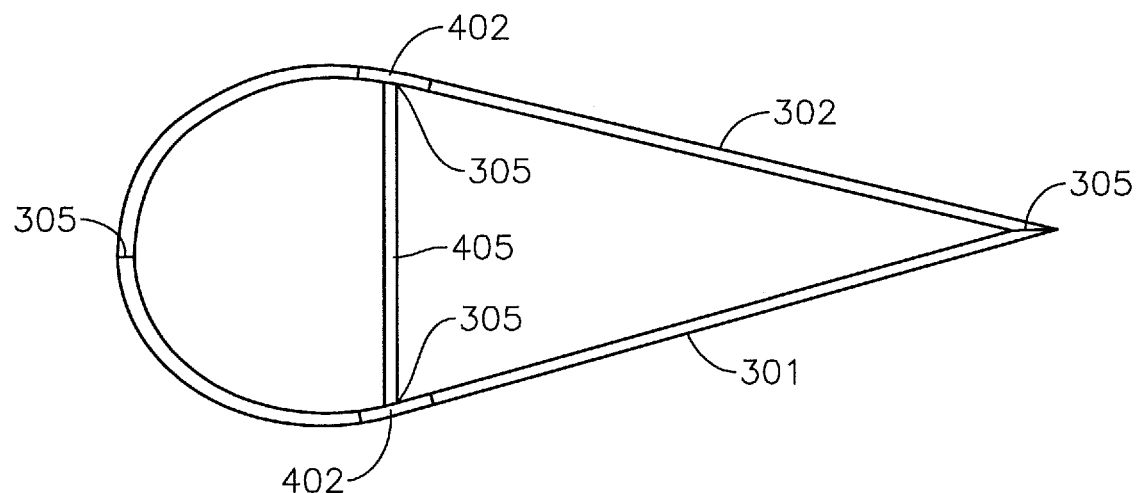
FIG. 5 is a cross-section taken along line 3-3 of FIG. 2 showing a wind turbine blade according to the embodiment in FIG. 4 of the disclosure.

While FIGS. 4 and 5 illustrates a lay-up mold, any type of mold that provides the desired wind turbine blade geometry may be used, including mold geometries that are capable of conforming to wind turbine blades 108.

In an embodiment of the present invention shown in FIG. 4, a spar cap structure 402 is placed on top of a few layers of fabric on a shell mold 403 and a shell fiber fabric 401 making a sandwich with polymeric foam and/or balsa wood is placed on a shell mold 403 adjacent the spar cap structure 402. The position of the spar cap structure 402 is illustrative, and should be interpreted as limiting the spar caps placement or positioning in the formation of a shell component. In one embodiment, the spar cap structure is formed from a series of pultrusions aligned lengthwise in a desired spar cap geometrical configuration, such as shown as a series of stacked columns of rectangular cross-sectional pultrusions 406 in FIG. 4. The invention contemplates that other pultrusion shapes, cross-sections, and lengths may be used in other configurations to form the spar cap.

A resin infusing structure 407, such as a bagging film or vacuum bag, capable of being configured to conform to the geometry of the surface having the spar cap structure 402 may be placed over the shell mold 403 having the spar cap structure 402 and shell fiber fabric 401 making a sandwich with polymeric foam and/or balsa wood. The resin infusing structure is sealed against shell mold 403 via tape 409 in order to allow drawing of vacuum on the spar cap structure 402 and shell fiber fabric 401 and respective spaces. Tape 409 may include any conventional sealing material suitable for vacuum sealing. Before the resin infiltration, air pockets are removed by the vacuum applied by ports 411. Then, resin infiltration happens and resin material is introduced through inlets 413 (one shown) and fills with resin the sandwich made of polymeric foam and/or balsa wood with fibers and the spar cap. Once cured, the resin hardens and forms a reinforced composite shell 415. Release materials/coatings, filler reinforcement materials, resin additives, peel ply, transfer media, release film and/or other consumable and/or conventional material for use with an infusion processes may be utilized in the formation of the wind turbine blade 108. This process allows the spar cap structure 402 and the shell fiber fabric 401 to be infused and formed at the same time so as to form the reinforced composite shell 415 in one infusion step. Since, this process eliminates a cure step for each shell used to form a blade, this process speeds production time with a reduced manufacturing footprint in a manufacturing facility.

Alternatively, the spar cap structure 402 can separately be made by resin infusion of the pultrusions described herein in the form of the spar cap structure in one or more composite formation steps. The pre-formed spar cap structure can then be positioned in the mold as shown in FIG. 4 for the spar cap structure 402, and the above described infusion process can be completed to form the reinforced composite shell 415.

A shear web 405 may be formed separately and can be made using resin infused fabric as described herein for the composite 415. Alternatively, the shear web 405 can be made by resin infusion of the pultrusions described herein in the form of a shear web structure in one or more composite formation steps.

To form the blade 108, a first shell having a first spar cap, such as shown in FIG. 4, may be brought into contact with a second shell having a second spar cap, such as also shown on FIG. 4. A shear web 405 is typically pre-adhered to one of the first or second shells at the respective spar cap and is aligned to contact the other spar cap as the shells are contacted together. Adhesive joints 305 are applied to contact surfaces. The adhesive joints are permitted to cure forming a wind turbine blade 108 structure as shown in FIG. 5.

In another embodiment, the shells, spar caps, and shear webs are assembled and then subject to an infusion process, or other resin application process, and curing process to form an integrated structure in one process rather than a two or three step process as described in FIGS. 4 and 5. Alternatively, the shells, spar caps, and shear webs may be treated part or in whole with adhesives prior to any resin application process.

The invention also contemplates the formation of windmill blades by other techniques that can utilize the formation of spar caps and/or shear webs using the composites as described herein.

While the present invention has been described and illustrated by reference to particular embodiments, those of ordinary skill in the art will appreciate that the invention lends itself to variations not necessarily illustrated herein.

What is claimed is:

1. An epoxy resin system, the epoxy resin system consisting essentially of:
 a liquid epoxy resin component comprising:
  a liquid epoxy resin; and
  an acrylate monomer;
 a curing agent component consisting essentially of:
  a compound having an imidazole group; and
  optionally, a co-curing agent for the compound having the imidazole group comprising a phenolic monomer compound, a branched chain carboxylic acid, or a combination thereof; and
 a non-aromatic polyol compound, wherein the epoxy resin system is free of a radical initiator, wherein the non-aromatic polyol compound optionally comprises part of the epoxy resin component, optionally comprises part of the curing agent component, optionally comprises part of the epoxy resin system with the liquid epoxy resin component and the curing agent component, or a combination thereof.

2. The epoxy resin system of claim 1, wherein the liquid epoxy resin component comprises an aromatic or a non-aromatic epoxy resin based on bisphenol A, bisphenol F, phenolic novolacs, hydrogenated bisphenol A, non-aromatic diols, or a combination thereof.

3. The epoxy resin system of claim 1, wherein the liquid epoxy resin component comprises:
from 50 to 99 parts of liquid epoxy resin; and
from 1 to 50 parts of the acrylate ester of a mono-ol or polyol, the methacrylate ester of a mono-ol or polyol, or a combination thereof.

4. The epoxy resin system of claim 1, wherein the acrylate monomer comprises an acrylate ester of a mono-ol or polyol, the methacrylate ester of a mono-ol or polyol, or a combination thereof.

5. The epoxy resin system of claim 1, wherein the compound having an imidazole group is a compound selected from the group consisting of imidazole, 1-methylimidazole, 2-methylimidazole, 2-propylimidazole, 2-ethyl-4-methylimidazole, 2-phenylimidazole, benzimidazole, toluimidazole, and combinations thereof.

6. The epoxy resin system of claim 1, wherein the compound having an imidazole group is present in the amount of 1 to 15 parts based on a total of 100 parts of the liquid epoxy resin component.

7. The epoxy resin system of claim 1, wherein the non-aromatic polyol compound comprises a number average molecular weight between about 1000 and 10000.

8. The epoxy resin system of claim 1, wherein the non-aromatic polyol compound comprises a glycol selected from the group consisting of poly(ethylene oxide) glycol, poly(propylene oxide) glycol, poly(butylene oxide) glycol, polytetrahydrofuran glycols, poly(ethylene adipate) glycol, poly(propylene sebacate) glycol, poly(hexamethylene carbonate) glycol, silicone-alkylene oxide copolymer, poly(butadiene-co-acrylonitrile) glycol, and combinations thereof.

9. The epoxy resin system of claim 1, wherein, if present, the phenolic monomer compound is selected from the group consisting of benzenediols, bisphenols, and combinations thereof.

10. The epoxy resin system of claim 1, wherein, if present, the branched chain carboxylic acid has 5-40 carbon atoms.

11. The epoxy resin system of claim 1, wherein the epoxy resin system is free of anhydride compounds, wherein the epoxy resin system is free of a core-shell rubber, or a combination thereof.

12. A composite prepared using the epoxy resin system of claim 1.

13. The composite of claim 12, wherein the composite is in the form of a windmill blade component.

14. A method for manufacturing a composite, comprising:
providing a reinforcing fiber substrate;
mixing the epoxy resin system of claim 1;
contacting the reinforcing fiber substrate with the epoxy resin system; and
curing the epoxy resin system to form the composite.

15. The method of claim 14, wherein contacting the reinforcing fiber substrate with the epoxy resin system comprises a pultrusion process.

16. The method of claim 14, wherein the non-aromatic polyol compound is provided with the liquid epoxy resin component, the curing agent component, or both.

17. The method of claim 14, wherein the epoxy resin system is free of anhydride compounds, wherein the epoxy resin system is free of a core-shell rubber, or a combination thereof.

* * * * *